United States Patent [19]

Pas

[11] 4,005,679
[45] Feb. 1, 1977

[54] METHOD AND APPARATUS FOR PRE-INCUBATING EGGS

[76] Inventor: Henricus Gerhardus Hermanus Maria Pas, 's-Heerenbergseweg 13, Zeddam, Netherlands

[22] Filed: Feb. 11, 1975

[21] Appl. No.: 548,936

[30] Foreign Application Priority Data

Feb. 13, 1974 Netherlands .................. 7401 94

[52] U.S. Cl. .................................. 119/35; 119/44
[51] Int. Cl.² ................................... A01K 41/00
[58] Field of Search ................ 119/15, 35–43

[56] References Cited

UNITED STATES PATENTS

| | | | |
|---|---|---|---|
| 2,314,344 | 3/1943 | Cornell | 119/18 |
| 3,147,737 | 9/1964 | Theilig | 119/35 |
| 3,618,734 | 11/1971 | Khan | 119/35 |

*Primary Examiner*—Louis G. Mancene
*Assistant Examiner*—Peter K. Skiff
*Attorney, Agent, or Firm*—Ladas, Parry, Von Gehr, Goldsmith & Deschamps

[57] ABSTRACT

A method for pre-incubating eggs in an incubator consisting of at least one incubating chamber, the eggs being introduced into the incubating chamber in the form of a plurality of stacks, staying in the chamber during the required pre-incubation period and then being removed and discharged, wherein the stacks by means of a continuously advancing conveyor are introduced into the incubating chamber, transported through the incubating chamber by this conveyor during the pre-incubation period, and then discharged by it to the outside.

An incubator consisting of at least one incubating chamber, comprising a conveyor moving with a continuous speed which introduces a plurality of stacks into the incubating chamber, guides the stacks through the incubating chamber and discharges the stacks to the outside after the required period of residence in the incubating chamber.

1 Claim, 9 Drawing Figures

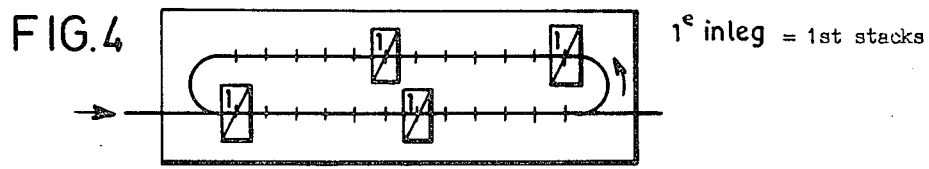
FIG.4    $1^e$ inleg = 1st stacks
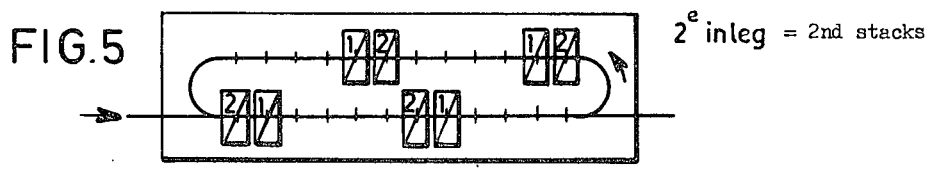
FIG.5    $2^e$ inleg = 2nd stacks
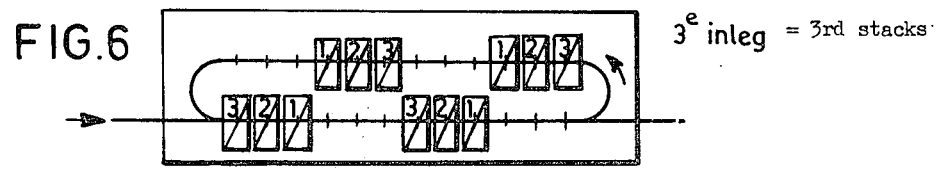
FIG.6    $3^e$ inleg = 3rd stacks
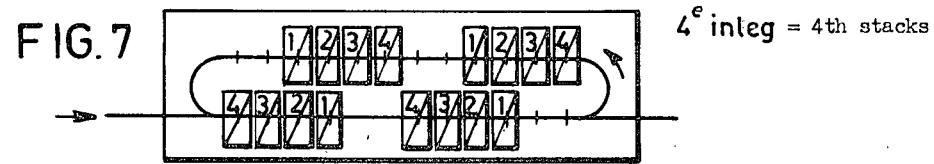
FIG.7    $4^e$ inleg = 4th stacks
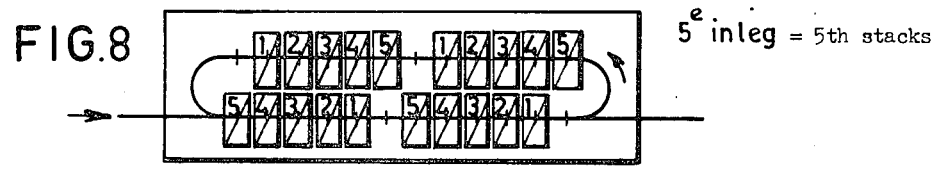
FIG.8    $5^e$ inleg = 5th stacks
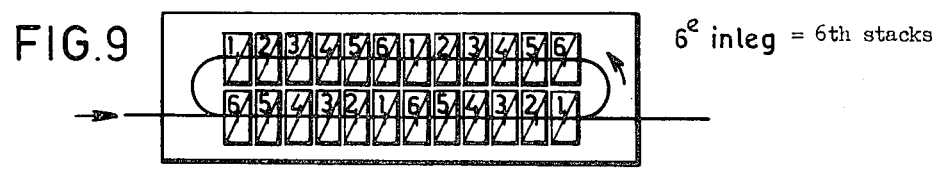
FIG.9    $6^e$ inleg = 6th stacks

METHOD AND APPARATUS FOR PRE-INCUBATING EGGS

The invention relates to a method for pre-incubating eggs in an incubator consisting of at least one incubating chamber, the eggs being introduced into the incubating chamber in the form of a plurality of stacks, staying in the chamber during the required pre-incubation period and then being removed and discharged.

So far the stacks in the shape of egg trays or egg trolleys were introduced manually into the incubating chamber and did not change of place therein. Also the positions of the egg trays remained unchanged. The introduction of again new charges of eggs into the incubating chamber constitutes great hygienic drawbacks, for when the warm incubating chamber is entered the risk of contamination is great. Owing to the static arrangement of the egg trays, furthermore, the energy necessary to have hot air brush over the egg trays by means of fans is very high. Finally, the height of the known incubating chambers is restricted by the height of the egg trays stacked upon each other or of the egg trolleys, so that in case of high chambers a certain volume thereof remains unused.

In accordance with the invention a method is suggested, therefore, which is characterized in that the stacks by means of a continuously advancing conveyor are introduced into the incubating chamber, transported through the pre-incubating chamber by this conveyor during said pre-incubating period and thereupon discharged by it to the outside. Owing to the continuous transport with a low speed of the egg trays in the incubating chamber they are subject to and cause, respectively, a favorable movement of air which is to the benefit of a correct distribution of temperature differences which arise from heat energy supplied to and delivered by living embryoes. Because the process of the introduction, the transport and the discharge to the outside can take place entirely automatically and because it is not necessary anymore to enter the incubating chamber the above-mentioned hygienic drawbacks are completely removed. Because, moreover, the egg trays are suspended from the conveyor which is attached to the ceiling of the incubating chamber, an optimum occupation of the available volume of the incubating chamber is obtained.

Owing to the fact that during the passing of the egg trays through the incubating chamber the trays are turned twice during one circulation and the egg trays always displace themselves in the incubating chamber and cause a favorable air circulation, the energy consumption will become considerably lower.

Furthermore, the invention, relates to an incubator consisting of at least one incubating chamber and comprising a conveyor moving onwards with a continuous speed, introducing a plurality of stacks into the incubating chamber, passing the stacks through the incubating chamber and discharging the stacks to the outside after the required period of residence, furthermore, means to attach the stacks to or detach them from the conveyor, furthermore means at the spots of the bends of the conveyor in the incubating chamber consisting of a guide and a roll cooperating herewith positioned on the frame of the stacks due to which the stacks during their movement through the bends are turned, the speed of the bends being greater than that of the straight parts of the conveyor adjoint to the bends and means to aspirate air, automatically preheat this air and distribute this preheated air homogeneously over the stacks in the incubating chamber.

The invention now will be further elucidated by way of the description and the annexed drawings in which.

FIGS. 4 through 9 indicate how the stacks, each time after a number of days are introduced into the incubating chamber.

Figure 1:
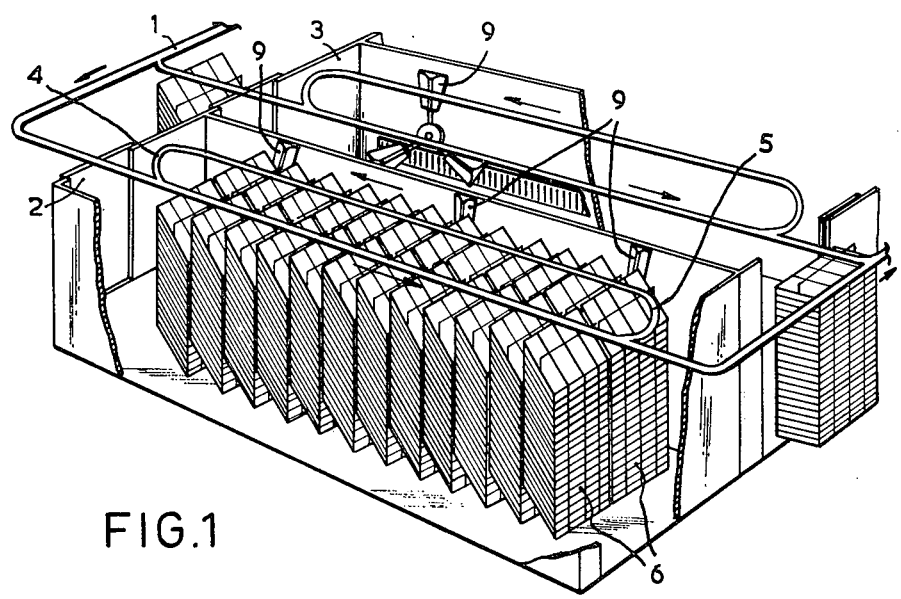
FIG. 1 is a perspective view of an incubating chamber and the present conveyor.
Figure 2:
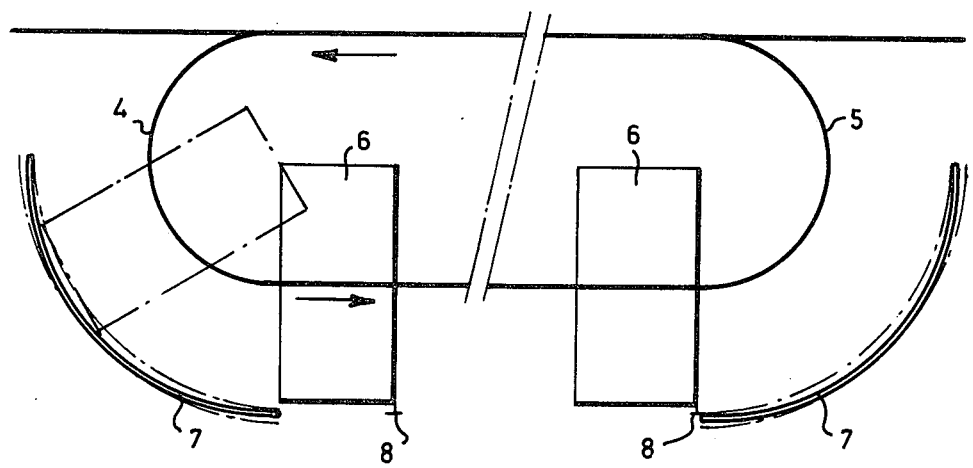
FIG. 2 is a top view of the conveyor in the incubating chamber and the means to cause the egg trays to turn.
Figure 3:
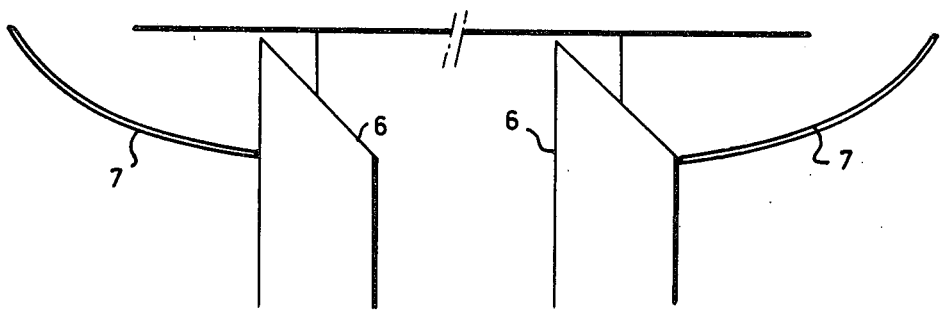
FIG. 3 is a front view of FIG. 2.

As indicated in FIG. 1 conveyor 1 passes through the various incubating chambers of the incubator positioned beside each other, only two incubating chambers 2 and 3 being indicated in this figure for the sake of simplicity. In each incubating chamber the conveyor forms a circular path in which switches, not further indicated, are incorporated at the spots where the bends 4, 5 adjoin the straight incoming or outgoing, respectively, part of the conveyor. The egg trays 6 suspended from each other may be automatically detached to or detached from, respectively, the conveyor, but since these coupling means do not form a part of the present invention they have not been indicated further. As indicated in FIG. 1 the egg trays are suspended from the conveyor in inclined position, this with a view to a favorable action of the hot air on them. When the egg trays pass through a bend in the direction of circulation indicated they get an accelerated movement, due to which the egg trays do not touch and hinder each other in the bends. To effect this the bends have a higher translation speed than the straight portions of the conveyor. Furthermore, it will be clear that the bends and the straight pieces of the conveyor are separate pieces. The somewhat higher circulation speed of the bends is derived from the main conveyor. Thus the center distances between the egg trays can be maintained as small as possible. As, furthermore, indicated in FIG. 1 the egg trays are to be turned when passing through the bends, this turning taking place twice during one circulation. In FIGS. 2 and 3 it is indicated how this turning of the egg trays takes place. At the spots of the bends guides 7 are located making an angle with the horizontal suspension path of the conveyor. At the corner of the frame of the egg trays 6 a roll or small wheel 8 is positioned capable of passing through guides 7. Now it will be clear that because of the particular arrangement of the guides 7 the egg trays are turned each time when passing through the bends 4 and 5. The angle the guide makes with the horizontal then determines the turning angle of the eggs trays.

Furthermore the egg trays are suspended under an angle of 45° from the conveyor by which an optimum degree of occupation of the egg trays on the conveyor is obtained. Finally the turning of the eggs under 45° is necessary with a view to a good heat distribution to maintain the embryo in the center of the egg by which saggings or agglutination are prevented.

In FIGS. 4 through 9 it is represented how each three days a sixth part of the total egg capacity is introduced. A pre-incubating period of 18 days is started from here. The scheme for the introduction of the egg trays into the incubating chamber has been chosen such that the eggs with the greatest superfluous exothermic reaction are moved onwards in such a way that these eggs start losing their superfluous calories and transmit these calories for the greater part to the subsequent stack of eggs. The eggs of this latter stack which, owing to the shorter period of lift react somewhat less exothermally, transmit, in their turn, the superfluous calories to the subsequent stack, etc. This more or less automatic process continues up to the eggs introduced last, which behave endothermally instead of exothermally and consequently need heat, this in connection with the embryonic growth. Thus an optimum heat exchange occurs between the eggs of each stack without it being necessary to interrupt the incubation process. At the same time it is clear that the incubation chamber always is occupied completely and that each 3 days a same number of egg trays is introduced into or discharged, respectively, from the incubation chamber, the total time of residence of each individual egg tray in the incubating chamber being 18 days.

In the various incubating chambers a plurality of pulsators 9 is positioned which aspirate fresh air, automatically preheat the air and homogeneously distribute the preheated air through the incubating chamber. It will be understood that owing to the continuous advance of the egg trays and the continuous turning hereof, the eggs are optimally brushed by the warm air by which temperature differences are reduced to an absolute minimum and the required energy for the pulsators need not be great.

The system described above in optimum from a hygienic point of view because the incubating chambers are not entered, the problem of cost being favorably influenced by the, if desired, programmed automatic operation.

What is claimed is:

1. In a method for incubating chicken eggs in an incubator in which hot air is displaced and distributed, wherein stacks consisting of a plurality of egg racks are introduced into the incubator, the stacks being maintained in said incubator during the required incubation period and then being discharged from said incubator, said racks being tilted a plurality of times, and during the incubation period of 18 days, each 3 days a group of said stacks being introduced into said incubator wherein the improvement comprises introducing said stacks into said incubator by a continuously moving conveyor, spacing equidistantly said stacks of the first group introduced on a substantially oval shaped conveyor track located inside said incubator, disposing stacks thereafter introduced on said track equidistantly apart and behind each said stack of the preceding group, and tilting each said egg rack in said incubator so that it rotates approximately 90° about a horizontal axis passing through said rack at least twice during each circulation thereof around said track.

* * * * *